United States Patent [19]
Oishi

[11] Patent Number: 6,002,556
[45] Date of Patent: Dec. 14, 1999

[54] ADAPTER FOR MAGNETIC DISC CARTRIDGE

[75] Inventor: Kengo Oishi, Kanagawa-ken, Japan

[73] Assignee: Fuji Photo Film Co., Ltd., Japan

[21] Appl. No.: 09/009,326

[22] Filed: Jan. 20, 1998

[30] Foreign Application Priority Data

Jan. 22, 1997 [JP] Japan .................................. 9-009236

[51] Int. Cl.⁶ ............................................. G11B 23/00
[52] U.S. Cl. .................................... 360/133; 369/289
[58] Field of Search ........................ 360/99.02, 99.03, 360/99.05, 133; 369/289

[56] References Cited

U.S. PATENT DOCUMENTS

| 5,610,902 | 3/1997 | Childers et al. | 369/289 |
| 5,715,233 | 2/1998 | Yoshida et al. | 369/289 |

FOREIGN PATENT DOCUMENTS

| 2-121174 | 5/1990 | Japan . |
| 2-187973 | 7/1990 | Japan . |
| 6-251483 | 9/1994 | Japan . |
| 6-333356 | 12/1994 | Japan . |
| 8-180636 | 7/1996 | Japan . |

*Primary Examiner*—Jefferson Evans
*Attorney, Agent, or Firm*—Brinks Hofer, Gilson & Lione; G. Peter Nichols

[57] ABSTRACT

An adapter which enables a smaller size magnetic disc cartridge to be driven by a disc drive system for a larger size magnetic disc cartridge has an adapter body which is substantially the same as the casing of the larger size magnetic disc cartridge in the outer dimensions and contour. A disc holding portion in which the smaller size magnetic disc cartridge can be removably set is formed in the adapter body. A first opening is formed in the adapter body in a position substantially corresponding to the position of the center core hole in the casing of the larger size magnetic disc cartridge, and a second opening is formed in the adapter body in a position substantially corresponding to the position of the magnetic head insertion window in the casing of the larger size magnetic disc cartridge. The smaller size magnetic disc cartridge is set in the disc holding portion so that its center core hole and magnetic head insertion window are respectively aligned with the first and second openings of the adapter body and the distance between the recording surface of the magnetic disc medium thereof and a reference surface of the adapter body is substantially equal to the distance between the recording surface of the magnetic disc medium of the larger size magnetic disc cartridge and a surface of the casing of the larger size magnetic disc cartridge corresponding to the reference surface of the adapter body.

2 Claims, 3 Drawing Sheets

ADAPTER FOR MAGNETIC DISC CARTRIDGE

BACKGROUND OF THE INVENTION

1. Field of the Invention

This invention relates to an adapter for a magnetic disc cartridge which enables a small size magnetic disc cartridge containing therein a small size magnetic disc medium to be driven by a magnetic disc drive system for a larger size magnetic disc cartridge containing therein a larger size magnetic disc medium.

2. Description of the Related Art

There has been known a magnetic disc medium, a so-called floppy disc, which comprises magnetic layers formed on opposite sides of a flexible disc base of a polyester sheet or the like. Information is recorded on the floppy disc by a magnetic head while rotating the floppy disc. The floppy disc is generally contained in a thin casing and is used in the form of a magnetic disc cartridge. Such magnetic disc cartridges have been mainly used as recording media for computers because they are easy to handle and can be produced at low cost.

In the magnetic disc cartridge, the casing is provided with a magnetic head insertion window for giving a magnetic head access to the magnetic disc therein on one or each side of the magnetic disc and the window is normally closed by a shutter member so that foreign matters such as dust cannot enter the casing.

Such a magnetic disc cartridge can also be suitably used for recording image information and the like in various miniaturized systems such as a digital camera without limiting to computers and when a magnetic disc cartridge is used in a miniaturized system, it is preferred that the magnetic disc cartridge be smaller in size. The advent of a smaller size magnetic disc cartridge will allow the miniaturized system to be more miniaturized and promote popularization of the systems.

Recently the storage capacity of the regular size magnetic disc cartridge has been increased by change in the recording system, improvement of the magnetic layer and the like. By applying the technique of increasing the storage capacity of the magnetic disc cartridge, the size of a magnetic disc cartridge having a storage capacity equivalent to that of the regular size magnetic disc cartridge can be smaller. However the smaller size magnetic disc cartridge cannot be driven by a magnetic disc drive system for the regular size magnetic disc cartridge.

When image information or the like which has been recorded on a smaller size magnetic disc cartridge by, for instance, a digital camera is to be processed by a computer, the digital camera must be connected to the computer by way of cables to transfer the image information recorded on the smaller size magnetic disc cartridge to the computer. However such information transfer operation is troublesome.

SUMMARY OF THE INVENTION

In view of the foregoing observations and description, the primary object of the present invention is to provide an adapter for a smaller size magnetic disc cartridge which enables the smaller size magnetic disc cartridge to be loaded in a disc drive system for a larger (regular) size magnetic disc cartridge so that magnetic recording and reproduction can be effected on the smaller size magnetic disc cartridge directly by the disc drive system for the larger size magnetic disc cartridge, thereby facilitating transfer of information and shortening the information transfer time.

Another object of the present invention is to provide an adapter for a smaller size magnetic disc cartridge which permits a magnetic head of the disc drive system for the larger size magnetic disc cartridge to stably acts on the magnetic disc medium of the smaller size magnetic disc cartridge loaded in the disc drive system held by the adapter.

The adapter in accordance with the present invention comprises an adapter body which is substantially the same as the casing of the larger size magnetic disc cartridge in the outer dimensions and contour, a disc holding portion which is formed in the adapter body and in which the smaller size magnetic disc cartridge can be removably set, a first opening formed in the adapter body in a position substantially corresponding to the position of the center core hole in the casing of the larger size magnetic disc cartridge, and a second opening formed in the adapter body in a position substantially corresponding to the position of the magnetic head insertion window in the casing of the larger size magnetic disc cartridge, and the smaller size magnetic disc cartridge is set in the disc holding portion of the adapter body so that its center core hole and magnetic head insertion window are respectively aligned with the first and second openings of the adapter body and the distance between the recording surface of the magnetic disc medium thereof and a reference surface of the adapter body is substantially equal to the distance between the recording surface of the magnetic disc medium of the larger size magnetic disc cartridge and a surface of the casing of the larger size magnetic disc cartridge corresponding to the reference surface of the adapter body.

Preferably the smaller size magnetic disc cartridge is set in the disc holding portion of the adapter body so that the distance between the chucking surface at which the rotating member of the disc drive system engages with the center core of the smaller size magnetic disc cartridge and the reference surface of the adapter body is substantially equal to the distance between the chucking surface at which the rotating member of the disc drive system engages with the center core of the larger size magnetic disc cartridge and the surface of the casing of the larger size magnetic disc cartridge corresponding to the reference surface of the adapter body.

The reference surface of the adapter body is a lower surface of the adapter body, that is, the surface of the adapter body which is opposed to the rotating member of the disc drive system when the adapter is loaded in the disc drive system and the surface of the casing of the larger size magnetic disc cartridge corresponding to the reference surface of the adapter body is the lower surface of the casing that is, the surface of the casing of the larger size magnetic disc cartridge which is opposed to the rotating member of the disc drive system when the larger size magnetic disc cartridge is loaded in the disc drive system.

By use of the adapter of the present invention, the smaller size magnetic disc cartridge can be directly driven and recording and reproduction can be directly effected on the smaller size magnetic disc cartridge by the disc drive system for the larger size magnetic disc cartridge, whereby information can be transferred without use of cables and rapid processing can be realized, which increases versatility of the smaller size magnetic disc cartridge.

Further by setting the distance between the recording surface of the magnetic disc medium of the smaller size magnetic disc cartridge as set in the disc holding portion and a reference surface of the adapter body substantially equal to the distance between the recording surface of the magnetic disc medium of the larger size magnetic disc cartridge and a surface of the casing of the larger size magnetic disc cartridge corresponding to the reference surface of the adapter body, recording and reproduction by the magnetic head of the disc drive system for the larger size magnetic disc cartridge can be effected as stably as the larger size magnetic disc cartridge. Similarly by setting the distance between the chucking surface of the center core of the smaller size magnetic disc cartridge and the reference surface of the adapter body substantially equal to the distance between the chucking surface of the center core of the larger magnetic disc cartridge and the surface of the casing thereof corresponding to the reference surface, the magnetic disc medium of the smaller size magnetic disc cartridge can be rotated by the disc drive system for the larger size magnetic disc cartridge as stable as that of the larger size magnetic disc cartridge.

DESCRIPTION OF THE PREFERRED EMBODIMENT

A preferred embodiment of the present invention will be described with reference to the drawings, where the dimensions of the elements are shown in ratios different from the real values for the purpose of simplicity of understanding.

Figure 5:
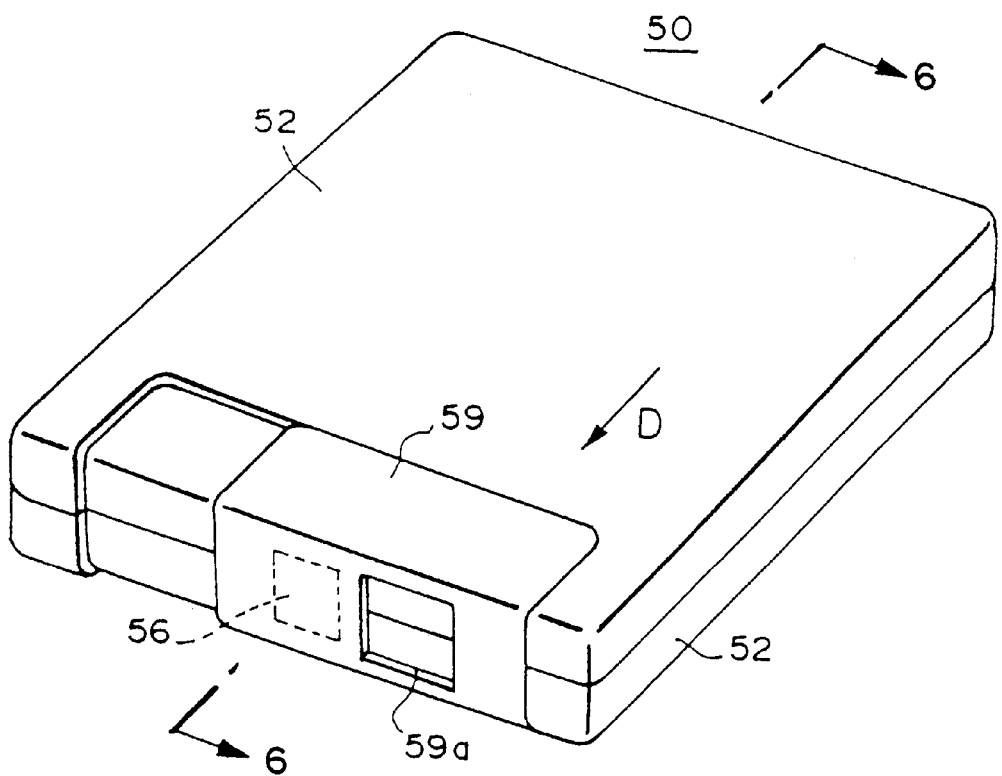
FIG. 5 is a perspective view of the regular size magnetic disc cartridge.

In FIGS. 1 to 6, an adapter 1 in accordance with an embodiment of the present invention has a body 2 of synthetic resin which is the same as a regular size magnetic disc cartridge shown in FIG. 5 in the outer dimensions and contour including the thickness and can be inserted into a disc drive system (not shown) for the regular size magnetic disc cartridge in the direction of arrow d. The adapter body 2 is provided with a disc holding portion 3 in which a smaller size magnetic disc cartridge 30 for a digital camera or the like is removably set. The disc holding portion 3 is in the form of a recess which opens upward and on one side of the adapter body 2.

Figure 6:
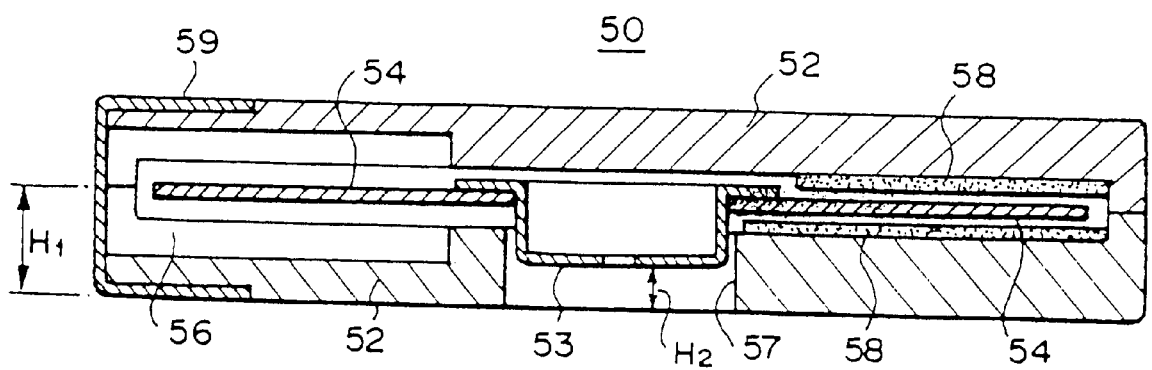
FIG. 6 is a cross-sectional view taken along line B—B in FIG. 5.

As shown in FIGS. 5 and 6, the regular size magnetic disc cartridge 50 comprises a thin casing (a hard casing) 52 and a magnetic disc medium 54 which is contained in the casing 52 and held by a center core 53 to be rotatable in the casing 52. A pair of liners 58 are disposed respectively between the upper surface of the magnetic disc medium 54 and the upper inner surface of the casing 52 and between the lower surface of the magnetic disc medium 54 and the lower inner surface of the casing 52. The magnetic disc medium 54 comprises a magnetic layer formed on one side or each side of a flexible disc base of a polyester sheet or the like.

The casing 52 comprises upper and lower shell halves mated together and is provided with a rectangular magnetic head insertion window 56 at its front end face. A circular center core hole 57, through which the disc drive system engages with the center core 53 and drives the magnetic disc medium 54, is formed in the lower surface of the casing 52 at the center thereof. The regular size magnetic disc cartridge 50 is inserted into the disc drive system in the direction of arrow D.

The recording surface of the magnetic disc medium 54 in the regular size magnetic disc cartridge 50 is set at level H1 from the lower surface of the casing 52 (a reference surface) and the chucking surface (the bottom surface) of the center core 53 is set at level H2 from the lower surface of the casing 52 (FIG. 6).

The level H1 is larger than half of the thickness of the casing 52. That is, the recording surface of the magnetic disc medium 54 is displaced upward from the center of the thickness of the inner space of the casing 52. Accordingly, a pressure difference is produced between upper and lower sides of the magnetic disc medium 54 when the magnetic disc medium 54 is rotated and the magnetic disc medium 54 is urged upward by the pressure difference, whereby the magnetic disc medium 54 is prevented from rattling or vibrating during rotation.

The casing 52 is further provided with a shutter member 59 which is slid in perpendicular to the direction of insertion D to open and close the magnetic head insertion window 56. When the magnetic head insertion window 56 is opened, the magnetic head of the disc drive system is inserted into the window 56 toward the magnetic disc medium 54. The shutter member 59 is substantially channel-shaped in cross-section and is provided with a window 59a, which can be aligned with the magnetic head insertion window 56 to open the same.

Though not shown, the disc drive system comprises a magnetic head in a position where it is opposed to the magnetic head insertion window 56 of the inserted magnetic disc cartridge 50 and a disc drive unit in a position where it is opposed to the center core 53 of the inserted magnetic disc cartridge 50. When the magnetic disc cartridge 50 is inserted into the disc drive system, a drive member (a rotating spindle) of the drive unit engages with the center core 53 of the magnetic disc cartridge 50 and rotates the magnetic disc medium 54 and the magnetic head approaches the recording surface of the magnetic disc medium 54 through the window 59a of the shutter member 59 and the magnetic head insertion window 56 of the casing for recording and reproduction.

Figure 1:
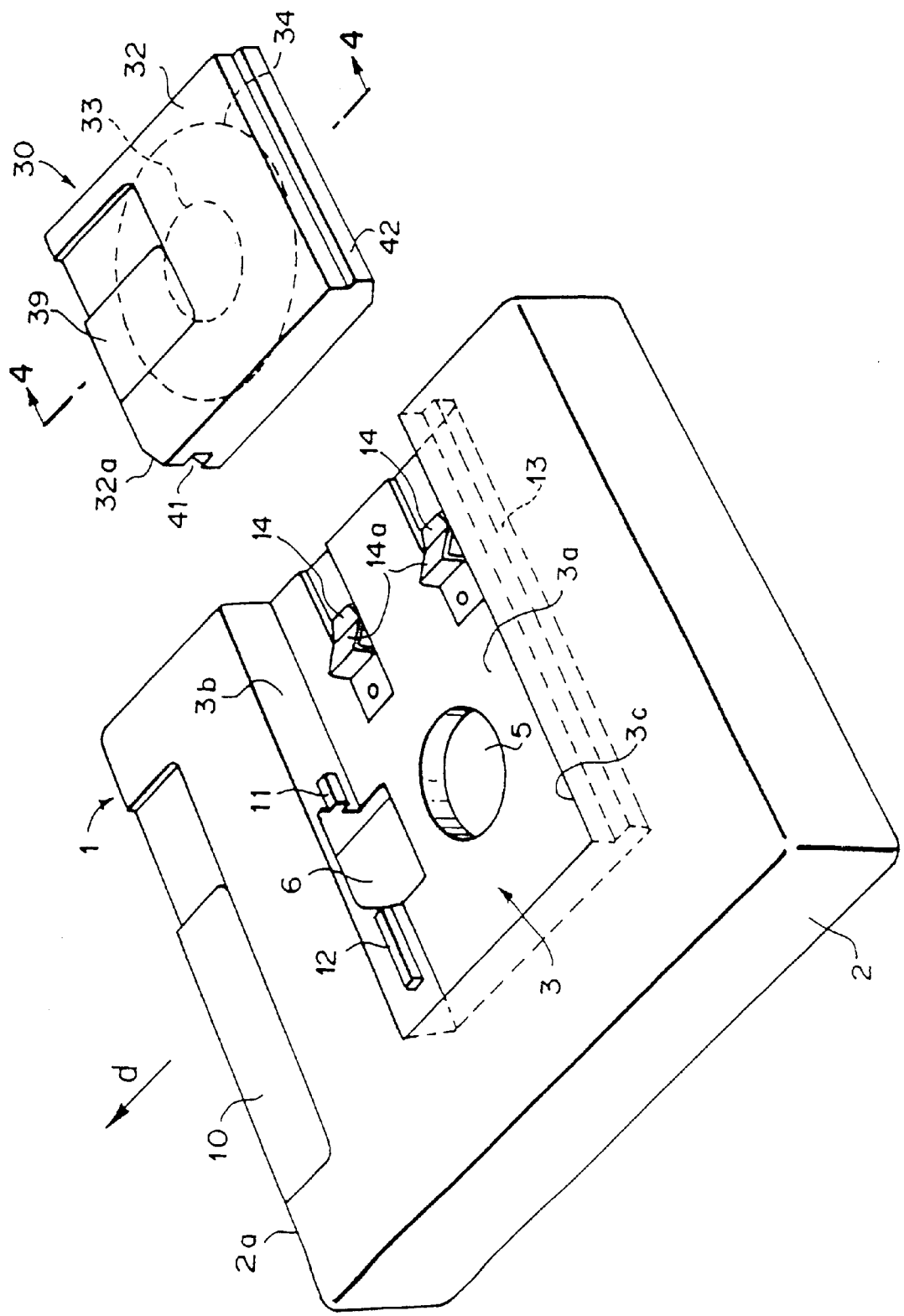
FIG. 1 is a perspective view showing an example of a smaller size magnetic disc cartridge and an adapter in accordance with an embodiment of the present invention for the smaller size magnetic disc cartridge.
Figure 3:
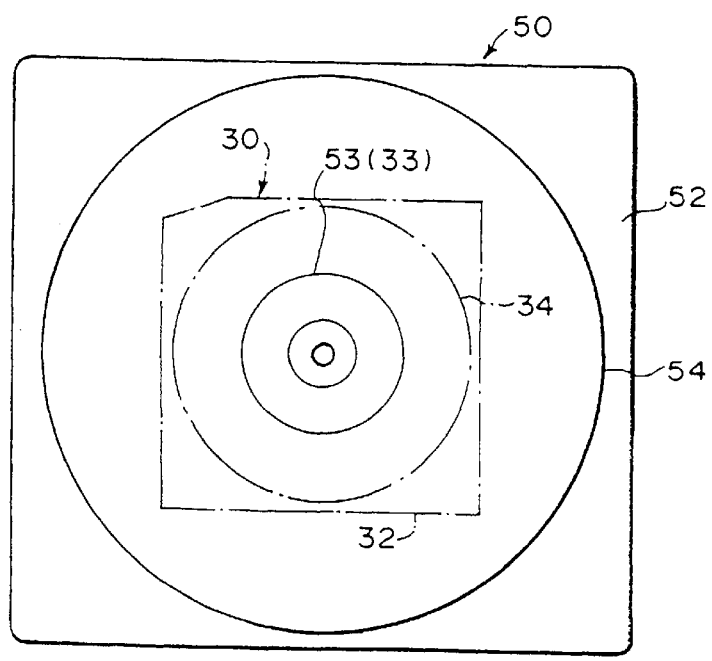
FIG. 3 is a plan view showing a regular size magnetic disc cartridge and the smaller size magnetic disc cartridge superposed the former on the latter.
Figure 4:
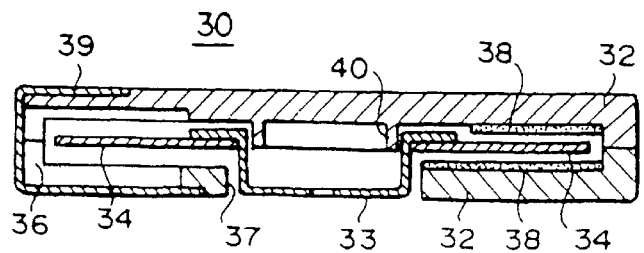
FIG. 4 is a cross-sectional view taken along line A—A in FIG. 1.

As shown in FIGS. 1 and 3, the smaller size magnetic disc cartridge 30 is basically the same in structure as the regular size magnetic disc cartridge 50 except that the former is smaller than the latter in dimensions. That is, the smaller size magnetic disc cartridge 30 comprises a thin casing (a hard casing) 32 thinner than the casing 52 of the regular size magnetic disc cartridge 50 and a magnetic disc medium 34 which is smaller in diameter than the magnetic disc medium 54 of the regular size magnetic disc cartridge 50. The magnetic disc medium 34 is contained in the casing 32 and held by a center core 33 to be rotatable in the casing 32. A pair of liners 38 are disposed respectively between the upper surface of the magnetic disc medium 34 and the upper inner surface of the casing 32 and between the lower surface of the magnetic disc medium 34 and the lower inner surface of the casing 32. The magnetic disc medium 34 comprises a magnetic layer formed on one side or each side of a flexible disc base of a polyester sheet or the like.

The casing 32 comprises upper and lower shell halves mated together and is provided with a magnetic head insertion window 36 extending from its front end face to its lower surface. A circular center core hole 37, through which a disc drive system engages with the center core 33 and drives the magnetic disc medium 34, is formed in the lower surface of the casing 32 at the center thereof. An annular projection 40 extends downward from the inner surface of the casing 32 above the center core hole 37 into the center core 33 and limits movement of the magnetic disc medium 34 in radial directions relative to the casing 32.

The casing 32 is further provided with a shutter member 39 which is slid in perpendicular to the direction of insertion d to open and close the magnetic head insertion window 36. The shutter member 39 is slid in a shallow recess formed in the surface of the casing 32. When the shutter member 39 is slid to open the magnetic head insertion window 56, the magnetic head of the disc drive system can be inserted into the window 36 toward the magnetic disc medium 34.

The shutter member 39 is substantially channel-shaped in cross-section and covers a front end portion of the casing 32, a part of the front end face of the casing 32 and a front end portion of the casing 32. The shutter member 39 is slid between a closing position where it closes the magnetic head insertion window 36 and an opening position where it opens the window 36.

The adapter 1 has first and second openings 5 and 6. The first opening 5 is formed in the bottom 3a of the disc holding portion 3 in a position corresponding to the position where the center core hole 57 of the regular size magnetic disc cartridge 50 is formed and is the same in shape and size as the center core hole 57. The second opening 6 is like a tunnel and front and rear ends of the second opening 6 open respectively at the front end face 2a of the adapter body 2 and toward the disc holding portion 3. The second opening 6 opens at the front end face 2a of the adapter body 2 in a position corresponding to the position where the magnetic head insertion window 56 of the regular size magnetic disc cartridge 50 is formed and in the shape which is the same as that of the window 56.

The smaller size magnetic disc cartridge 30 is set in the disc holding portion 3 of the adapter 1 so that the center core hole 37 is aligned with the first opening 5 and the magnetic head insertion opening 36 is aligned with the second opening 6.

The smaller size magnetic disc cartridge 30 is inserted into the disc holding portion 3 of the adapter 1 from one side surface thereof by moving the cartridge 30 in perpendicular to the direction of insertion d of the adapter 1 into the disc drive system. The disc holding portion 3 is provided with a shutter opening protrusion 11 which moves the shutter member 39 toward the opening position in response to insertion of the smaller size magnetic disc cartridge 30 into the disc holding portion 3, holds the shutter member 39 in the opening position while the magnetic disc cartridge 30 is held in the disc holding portion 3 and moves the shutter member 39 toward the closing position in response to ejection of the magnetic disc cartridge 30 from the disc holding portion 3. The disc holding portion 3 is further provided with a guide protrusion 12 which guides the magnetic disc cartridge 30 to a predetermined set position and holds it there and a pair of plate springs 14 for retaining the magnetic disc cartridge 30 in the set position.

Specifically, a groove 41 is formed on the front end face of the smaller size magnetic disc cartridge 30 to extend transversely, and an engagement protrusion 42 is formed on the rear end face of the magnetic disc cartridge 30 to extend transversely. The aforesaid shutter opening protrusion 11 is formed on the front face 3b of the disc holding portion 3 on the outer side of the second opening 6 and the aforesaid guide protrusion 12 is formed on the front face 3b of the disc holding portion 3 on the inner side of the second opening 6. The shutter opening protrusion 11 and the guide protrusion 12 are adapted to be engaged with the groove 41 of the smaller size magnetic disc cartridge 30. The shutter opening protrusion 11 is adapted to be brought into abutment against the shutter member 39 of the magnetic disc cartridge 30 through the groove 41 and moves the shutter member 39 to the opening position in response to insertion of the magnetic disc cartridge 30 into the disc holding portion 3. On the rear surface 3c of the disc holding portion 3, there is provided a retainer groove 13 which is engaged with the engagement protrusion 42 of the magnetic disc cartridge 30.

By virtue of engagement of the groove 41 on the magnetic disc cartridge 30 and the shutter opening protrusion 11 and the guide protrusion 12 on the adapter 1 and engagement of the engagement protrusion 42 on the magnetic disc cartridge 30 and the retainer groove 13 on the adapter 1, the magnetic disc cartridge 30 is properly guided to the set position in the disc holding portion 3, correctly located in the set position and surely held in the set position not to be displaced upward. Further since the engagement means on the front and rear ends faces of the magnetic disc cartridge 30 are different from each other, one being a groove and the other being a protrusion, the magnetic disc cartridge 30 can be inserted into the disc holding portion 3 only in the correct position. The front corner on the left side of the magnetic disc cartridge 30, which is the leading side when the magnetic disc cartridge 30 is inserted into the disc holding portion 3, is provided with a tapered surface 32a to facilitate insertion of the magnetic disc cartridge 30 into the disc holding portion 3 of the adapter 1.

Each of the plate springs 14 provided on the bottom 3a of the disc holding portion 3 for retaining the magnetic disc cartridge 30 in the set position has a projecting portion 14a on its intermediate portion and is fixed to the bottom 3a at its one end with its the other end set free to be movable along the bottom 3a. The projecting portion 14a has inclined surfaces on its front and rear sides so that the magnetic disc cartridge 30 can ride across the projecting portion in either direction. When the magnetic disc cartridge 30 rides across the projecting portion 14a to the predetermined position, the projecting portion 14a is once flattened and then restored under its resiliency, thereby holding the magnetic disc cartridge 30 in the predetermined position. When the magnetic disc cartridge 30 is taken out from the adapter 1, the magnetic disc cartridge 30 is pushed outward and the projecting portion 14a is flattened under its resiliency to permit the magnetic disc cartridge 30 to ride across the projecting portion 14a.

As the means for holding the magnetic disc cartridge 30 in the predetermined position, a retractable projection, hook or the like may be used in place of the plate springs 14. Further such means may be provided at least one of the front and rear faces 3b and 3c of the disc holding portion 3 in place of the bottom 3a.

In this particular embodiment, a shutter member 10 for closing and opening the second opening 6 is provided on the front end face of the adapter body 2. This shutter member 10 corresponds to the shutter member 59 of the regular size magnetic disc cartridge 50 and is opened in response to insertion of the adapter 1 into the disc drive system by the shutter opening mechanism of the disc drive system. The shutter member 10 may be omitted.

Figure 2:
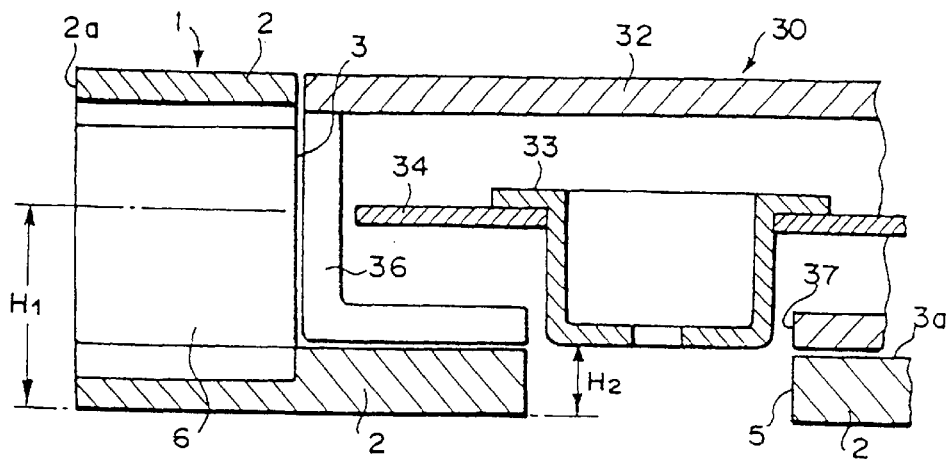
FIG. 2 is a fragmentary cross-section view of an important part of the adapter with the smaller size magnetic disc cartridge held therein.

As shown in FIG. 2, in the state where the smaller size magnetic disc cartridge 30 is set in the adapter 1, the recording surface of the magnetic disc medium 34 in the smaller size magnetic disc cartridge 30 is set from the lower surface of the adapter body 2 (a reference surface) at the same level as the recording surface of the magnetic disc medium 54 in the regular size magnetic disc cartridge 50 from the lower surface of the casing 52 (H1) and the chucking surface (the bottom surface) of the center core 33 of the magnetic disc medium 34 in the smaller size magnetic disc cartridge 30 is set from the lower surface of the adapter body 2 at the same level as the chucking surface of the center core 53 in the regular size magnetic disc cartridge 50 from the lower surface of the casing 52 (H2).

As shown in FIG. 3, the center core 33 of the smaller size magnetic disc cartridge 30 is the same in shape as the center core 53 of the regular size magnetic disc cartridge 50 and the smaller size magnetic disc cartridge 30 differs from the regular size magnetic disc cartridge 50 in that the outer diameter of the magnetic disc medium 34 is smaller than that of the magnetic disc medium 54.

Since the casing 32 of the smaller size magnetic disc cartridge 30 is thinner than that of the regular size magnetic disc cartridge 50, it is preferred that the recording surface of the magnetic disc medium 34 be positioned at the center of the thickness of the casing 32 in order to ensure reliability whereas in the case of the regular size magnetic disc cartridge 50 where the casing 52 is relatively thick, it is preferred that the recording surface of the magnetic disc medium 54 be displaced upward from the center of the thickness of the inner space of the casing 52 for the reason described above. Accordingly, the base of the disc holding portion 3 should have a thickness which yields level Hl together with half of the thickness of the casing 32 of the smaller size magnetic disc cartridge 30.

However when the recording surface of the magnetic disc medium 54 of the regular size magnetic disc cartridge 50 is positioned at the center of the thickness of the casing 52, the base of the disc holding portion 3 may have a thickness which will position the recording surface of the magnetic disc medium 34 of the smaller size magnetic disc cartridge 30 at the center of the thickness of the adapter body 2.

Use of the adapter 1 will be described, hereinbelow. When a smaller size magnetic disc cartridge 30 on which information such as image information has been recorded by a miniaturized system such as a digital camera is to be driven by a disc drive system for a computer which uses the regular size magnetic disc cartridge 50, the smaller size magnetic disc cartridge 30 is inserted into the disc holding portion 3 of the adapter 1 in a direction perpendicular to the direction d of insertion of the adapter 1 into the disc drive system and held in the predetermined position. When the smaller size magnetic disc cartridge 30 is thus loaded in the adapter 1, the center core 33 of the smaller size magnetic disc medium 34 is brought into alignment with the first opening 5 in the bottom 3a of the disc holding portion 3 and the magnetic head insertion window 36 of the smaller side magnetic disc cartridge 30 is brought into alignment with the second opening 6 with the shutter member 39 held open by the shutter opening protrusion 11. In this state, the distance of the smaller size magnetic disc medium 34 from the lower surface (the reference surface) of the adapter body 2 and the position of the axis of rotation of the magnetic disc medium 34 are the same as the distance of the magnetic disc medium 54 of the regular size magnetic disc cartridge 50 from the lower surface of the casing 52 and the position of the axis of rotation of the magnetic disc medium 54, respectively.

When the adapter 1 loaded with the smaller size magnetic disc cartridge 30 is loaded in the disc drive system for the regular size magnetic disc cartridge 50, the rotating member (spindle) of the drive unit engages with the center core 33 of the smaller size magnetic disc medium 34 through the first opening 5 and rotates the magnetic disc medium 34 while the magnetic head of the disc drive system approaches the recording surface of the magnetic disc medium 34 to read out the information recorded on the magnetic disc medium 34 or to revise the information. After completion of such operation the adapter 1 is taken out from the disc drive system and the smaller size magnetic disc cartridge 30 is taken out from the adapter 1.

In response to taking out the smaller size magnetic disc cartridge 30, the shutter member 39 is returned to its closing position.

The adapter 1 of this embodiment is advantageous in that since the smaller size magnetic disc cartridge 30 is inserted into the disc holding portion 3 in a direction perpendicular to the direction of insertion of the adapter 1 into the disc drive system, the mechanism for opening and closing the shutter member 39 automatically in response to insertion of the smaller size magnetic disc cartridge 30 may be simple in structure and the mechanism for locating and holding the smaller size magnetic disc cartridge 30 in the disc holding portion 3 may be simple in structure and action, whereby reliability of the mechanism can be high.

Further since the bottom surface 3a of the disc holding portion 3 is in the form of a flat plate, even if the smaller size magnetic disc cartridge 30 is set in the disc holding portion in somewhat deformed state, the adapter 1 loaded with the smaller size magnetic disc cartridge 30 can be handled in the same manner as the regular size magnetic disc cartridge 50 and can be loaded in the disc drive system for the regular size magnetic disc cartridge 50 without fear of damaging the smaller size magnetic disc cartridge 30, whereby high reliability can be ensured.

What is claimed is:

1. An adapter which enables a smaller size magnetic disc cartridge to be driven by a disc drive system for a larger size magnetic disc cartridge, each of the magnetic disc cartridges comprising a casing and a magnetic disc medium which is contained in the casing held by a center core to be rotatable in the casing, the casing being provided with a center core hole through which a rotating member of a disc drive system engages with the center core to rotate the magnetic disc medium and a magnetic head insertion window which gives a magnetic head of the disc drive system access to the magnetic disc medium, which adapter comprising an adapter body which is substantially the same as the casing of the larger size magnetic disc cartridge in the outer dimensions and contour, a disc holding portion which is formed in the adapter body and in which the smaller size magnetic disc cartridge can be removably set by being slid in a direction perpendicular to a direction of insertion of the adapter into a disc drive system for a larger size magnetic disc cartridge, a first opening formed in the adapter body in a position substantially corresponding to the position of the center core hole in the casing of the larger size magnetic disc cartridge, and a second opening formed in the adapter body in a position substantially corresponding to the position of the magnetic head insertion window in the casing of the larger size magnetic disc cartridge, the smaller size magnetic disc cartridge being set in the disc holding portion of the adapter body so that its center core hole and magnetic head insertion window are respectively aligned with the first and second openings of the adapter body and the distance between the recording surface of the magnetic disc medium thereof and a reference surface of the adapter body is substantially equal to the distance between the recording surface of the magnetic disc medium of the larger size magnetic disc cartridge and a surface of the casing of the larger size magnetic disc cartridge corresponding to the reference surface of the adapter body.

2. An adapter as defined in claim 1 in which the smaller size magnetic disc cartridge is set in the disc holding portion of the adapter body so that the distance between the chucking surface at which the rotating member of the disc drive system engages with the center core of the smaller size magnetic disc cartridge and the reference surface of the adapter body is substantially equal to the distance between the chucking surface at which the rotating member of the disc drive system engages with the center core of the larger size magnetic disc cartridge and the surface of the casing of the larger size magnetic disc cartridge corresponding to the reference surface of the adapter body.

* * * * *